(12) United States Patent
Urlacher (10) Patent No.: US 12,429,459 B1
(45) Date of Patent: Sep. 30, 2025

(54) OEM SCANNING MACHINE SKID AND ROLLING CART SYSTEM FOR PICKUP BOX

(71) Applicant: Jay R. Urlacher, Dickinson, ND (US)

(72) Inventor: Jay R. Urlacher, Dickinson, ND (US)

( * ) Notice: Subject to any disclaimer, the term of this patent is extended or adjusted under 35 U.S.C. 154(b) by 0 days.

(21) Appl. No.: 19/015,294

(22) Filed: Jan. 9, 2025

(51) Int. Cl.
    *G01N 29/22* (2006.01)

(52) U.S. Cl.
    CPC ................ *G01N 29/225* (2013.01)

(58) Field of Classification Search
    CPC . B60P 3/00; B60P 3/068; B65G 21/20; B65G 21/22; B65G 41/007; B65G 41/008
    USPC ............................ 193/41; 414/679
    See application file for complete search history.

(56) References Cited

U.S. PATENT DOCUMENTS

| | | | |
|---|---|---|---|
| 5,080,241 A | 1/1992 | Konstant | |
| 5,178,288 A | 1/1993 | Werner | |
| 6,158,943 A | 12/2000 | Sullivan | |
| 7,114,904 B2 * | 10/2006 | Charbonneau | B65G 1/026 |
| | | | 211/59.2 |
| 10,427,834 B2 | 10/2019 | Melland | |
| 10,710,801 B1 * | 7/2020 | Iellimo | B65G 1/06 |
| 11,549,313 B2 | 1/2023 | Valadares | |
| 2002/0164239 A1 | 11/2002 | Angermeier | |

FOREIGN PATENT DOCUMENTS

| | | | |
|---|---|---|---|
| BR | 8504810 A | 5/1987 | |
| EP | 0630779 A2 | 3/1995 | |
| JP | 2006273390 A | 10/2006 | |
| WO | 1992014661 A1 | 9/1992 | |

OTHER PUBLICATIONS

Isometric Sketch of Prior Device by Inventor, Approx. Sale Date: 2019; No Publicly Available Documentation. Sold in limited quantities without public advertising.

* cited by examiner

*Primary Examiner* — Leslie A Nicholson, III
(74) *Attorney, Agent, or Firm* — Neustel Law Offices (57) ABSTRACT

An apparatus for transporting a scanning machine includes a skid, a cart, and a rail system. The skid is configured to support the scanning machine and comprises a rectangular skid frame, a mesh surface secured to the frame providing traction and support for users, and multiple tubular support members coupled to the frame that elevate it above a subordinate surface. The cart includes a cart frame configured to receive and support the skid, and multiple v-groove wheels connected to the cart frame. The rail system comprises a pair of elongated rails configured to support and guide the cart, where the v-groove wheels engage with the rails allowing controlled movement of the cart along the rails to transport the skid and scanning machine. The apparatus provides stable and precise positioning during loading, transport, and unloading operations through the integrated rail guidance system and secure skid-to-cart interface.

20 Claims, 7 Drawing Sheets

OEM SCANNING MACHINE SKID AND ROLLING CART SYSTEM FOR PICKUP BOX

CROSS REFERENCE TO RELATED APPLICATIONS

Not applicable to this application.

STATEMENT REGARDING FEDERALLY SPONSORED RESEARCH OR DEVELOPMENT

Not applicable to this application.

FIELD

This technology pertains to an improved transport skid or cart system designed to enhance durability, stability, and maneuverability for efficient handling and transportation of goods in diverse industrial environments.

BACKGROUND

Existing solutions for transporting and positioning oil and gas scanning machines or other similar apparatuses in field operations face significant challenges that impact both efficiency and safety. These scanning machines, which are used for wellhead and pipeline inspection operations, require precise positioning and careful handling during transport and deployment. Traditional methods often involve manually dragging heavy skids to the tailgate of a pickup truck, creating unnecessary physical strain on operators and risking damage to expensive scanning equipment.

Current transport solutions fail to address the unique demands of oil and gas field environments. Traditional skid designs lack proper elevation and stability features needed for accurate scanner positioning at wellheads. Most existing systems are not optimized for use with hook loaders. Hook loaders in oil and gas field operations typically refer to various lifting equipment including front end loaders, backhoes, skid steers, or similar machinery equipped with lifting devices or stinger attachments. These pieces of equipment are commonly available at well sites and are essential for safely moving and positioning scanning equipment. The versatility to work with different types of lifting equipment is crucial since specific machinery may not always be available at every location. This incompatibility often results in awkward and potentially dangerous loading and unloading procedures. Furthermore, conventional skid designs often lack adequate operator platforms or safety features, making it difficult for personnel to safely access and operate the scanning equipment once positioned.

Many current designs suffer from stability issues during transport and deployment. The combination of heavy scanning equipment and uneven field terrain creates particular challenges that standard skid or cart systems are ill-equipped to handle. Traditional transport systems often lack proper securing mechanisms during transit, leading to potential movement or shifting of expensive scanning equipment. Additionally, existing solutions typically don't account for the varied lengths of different pickup truck beds, limiting their versatility across different vehicle configurations commonly used in field operations.

The industry currently lacks a comprehensive solution that addresses both the transportation and operational requirements of oil and gas scanning equipment. Existing systems often require operators to make compromises between transport safety, ease of deployment, and operational effectiveness. These limitations result in increased setup times, greater physical risk to operators, and potential damage to sensitive scanning equipment. There is a clear need for an integrated transport system that can safely secure scanning equipment during transit while facilitating easy deployment and precise positioning in field environments.

SUMMARY

According to some embodiments, the present disclosure is directed to an apparatus for transporting a scanning machine. The apparatus also includes a skid configured to support a scanning machine. The skid may include a skid frame having a rectangular configuration. The apparatus also includes a mesh surface secured to the skid frame, the mesh surface configured to provide traction and support for a user. The apparatus also includes a plurality of support members coupled to the skid frame, the support members elevating the frame above a subordinate surface when placed in a target location. The apparatus also includes a cart may include a cart frame configured to receive and support the skid. The apparatus also includes a plurality of v-groove wheels connected to the cart frame. The apparatus also includes a rail system configured to support the cart, the rail system May include a pair of elongated rails, where the v-groove wheels of the cart engage with the pair of elongated rails, where the cart is movable along the rails to transport the skid and the scanning machine.

Implementations may include one or more of the following features. The apparatus where the rail system further may include a folding extension pivotally coupled to an end of the rail system, the folding extension being configured to rotate between a deployed position and a stowed position. The folding extension, when in the deployed position, increases an overall length of the rail system, and when in the stowed position, is secured to lock the skid in place. The apparatus may include a stop member positioned at a distal end of the folding extension. The cart is configured to move along the rail system from a first position adjacent to a front end of a truck bed to a second position adjacent to a rear end of the truck bed. The apparatus may include angled support members secured to opposing longitudinal portions of the skid frame and slope inward to form a narrowed support opening for receiving the scanning machine, each angled support member being reinforced by triangular gusset plates between the angled support members and the skid frame. The skid further may include a locking member may include a threaded rod pivotally connected to the rail system, where the threaded rod is configured to rotate between a vertical locked position and a horizontal unlocked position. The apparatus may include an engagement plate extending from the cart frame, the locking member mating with the engagement plate. The cart frame may include angled frame members that form an upper peripheral opening of the cart frame.

One general aspect includes an apparatus for transporting a scanning machine. The apparatus also includes a skid configured to support a scanning machine, the skid May include a skid frame. The apparatus also includes a first mesh surface secured to an upper side of the skid frame, the first mesh surface configured to provide traction. The apparatus also includes a plurality of tubular support members welded to the frame at an oblique angle relative to a ground surface, the tubular support members elevating the skid above the ground surface, where the tubular support members may include a first pair at a first end of the skid and a second pair at a second end of the skid, the first and second pairs being angled in opposite directions. The apparatus also includes a cart may include a cart frame configured to receive and support the skid. The apparatus also includes a plurality of v-groove wheels connected to the cart frame. The apparatus also includes a handle attached to the cart frame to facilitate manual movement of the cart. The apparatus also includes a rail system configured to support the cart, the rail system may include a pair of elongated rails, where the v-groove wheels of the cart engage with the pair of elongated rails. The apparatus also includes a locking member pivotally connected to the rail system, the threaded rod configured to rotate between a vertical locked position and a horizontal unlocked position and engage with the cart. The apparatus also includes a folding extension pivotally coupled to an end of the rail system, the folding extension being configured to rotate between a deployed position and a stowed position, and a stop member positioned at a distal end of the folding extension. The apparatus also includes where the cart is movable along the rails to transport the skid and the scanning machine between a front end and a rear end of a truck bed, and the folding extension, when in the deployed position, increases an overall length of the rail system, and when in the stowed position, is secured to lock the skid in place.

The apparatus where the v-groove wheels are mounted to the cart frame in a low-profile configuration. The apparatus may include an engagement plate extending from the cart frame. The locking member may include: a threaded rod pivotally mounted to the rail system; a first threaded fastener engaged with the threaded rod above the engagement plate; and a second threaded fastener engaged with the threaded rod below the engagement plate. The engagement plate includes a notch, the threaded rod being received in the notch when in the vertical locked position. The apparatus may include a second mesh surface secured to an opposing side of the skid frame relative to the first mesh surface. The folding extension may include a pair of extension rails aligned with the elongated rails when in the deployed position, and a cross-member connecting the extension rails at their distal ends. The handle of the cart may include a u-shaped bar coupled to the cart frame. Each metal plate of the skid may include a vertical portion welded to a lateral member of the frame and a horizontal portion extending inward to support an edge of the scanning machine. The apparatus May include multiple locking members positioned along both longitudinal sides of the rail system, each locking member may include a threaded rod with first and second threaded fasteners, configured to secure the cart at multiple points. The skid may include a plurality of metal plates bent at an angle and attached to the skid frame to provide lateral support for the scanning machine.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evidence to the contrary from the description, where elements in different figures use identical reference numbers, the elements are generally either identical or at least similar in function or purpose.

DETAILED DESCRIPTION

A. Overview

The present disclosure pertains to an apparatus for safely transporting and deploying oil and gas well scanning machines or other devices between a vehicle and field operation sites. The system includes three integrated components—a skid, a rolling cart, and a rail system—that work together to eliminate the traditional need to physically drag equipment to a truck's tailgate while keeping operators safely clear during hook loader operations.

The skid assembly provides a stable platform specifically designed for supporting and securing the scanning machine. It features a rectangular frame with a heavy-duty mesh surface that serves dual purposes: providing secure footing for operators during setup and creating a stable platform for the scanning equipment. The skid's longer base design improves stability during hook loader engagement. Support members are welded at opposing angles to the skid frame (at each corner), elevating it to optimize access and enable proper positioning during scanning operations. The extended base configuration of the skid serves multiple functions. First, it creates additional clearance between the scanning machine's setting point and the operator's position, enhancing safety during deployment and operation. The increased platform area provides stable footing for personnel during setup and scanning procedures. Additionally, the combination of the extended base design and the tubular support members creates an effective shock absorption system that helps protect the sensitive scanning equipment from impact and vibration during transport and positioning operations.

The cart assembly is purpose-built to carry the skid assembly, featuring a reinforced frame with angled members that safely cradle the skid. The cart's dual-configuration design allows for both high and low-profile setups (see FIGS. 6 and 7). In the high-profile configuration, V-groove wheels mount under the cart for shorter rail systems, while the low-profile setup positions wheels at the cart ends for longer rail systems. This adaptability allows the system to accommodate different pickup box lengths.

The rail system provides guided tracks for the cart's V-groove wheels, enabling controlled movement from the truck bed's front to its tailgate. A folding extension on the rail system rotates between transport and deployment positions, facilitating safe loading and unloading operations while keeping operators clear of the hook loader's operating zone. The rails include built-in stops and multiple locking points using threaded rods to secure the cart during transport and operation.

B. EXAMPLE EMBODIMENTS

Figure 1A:
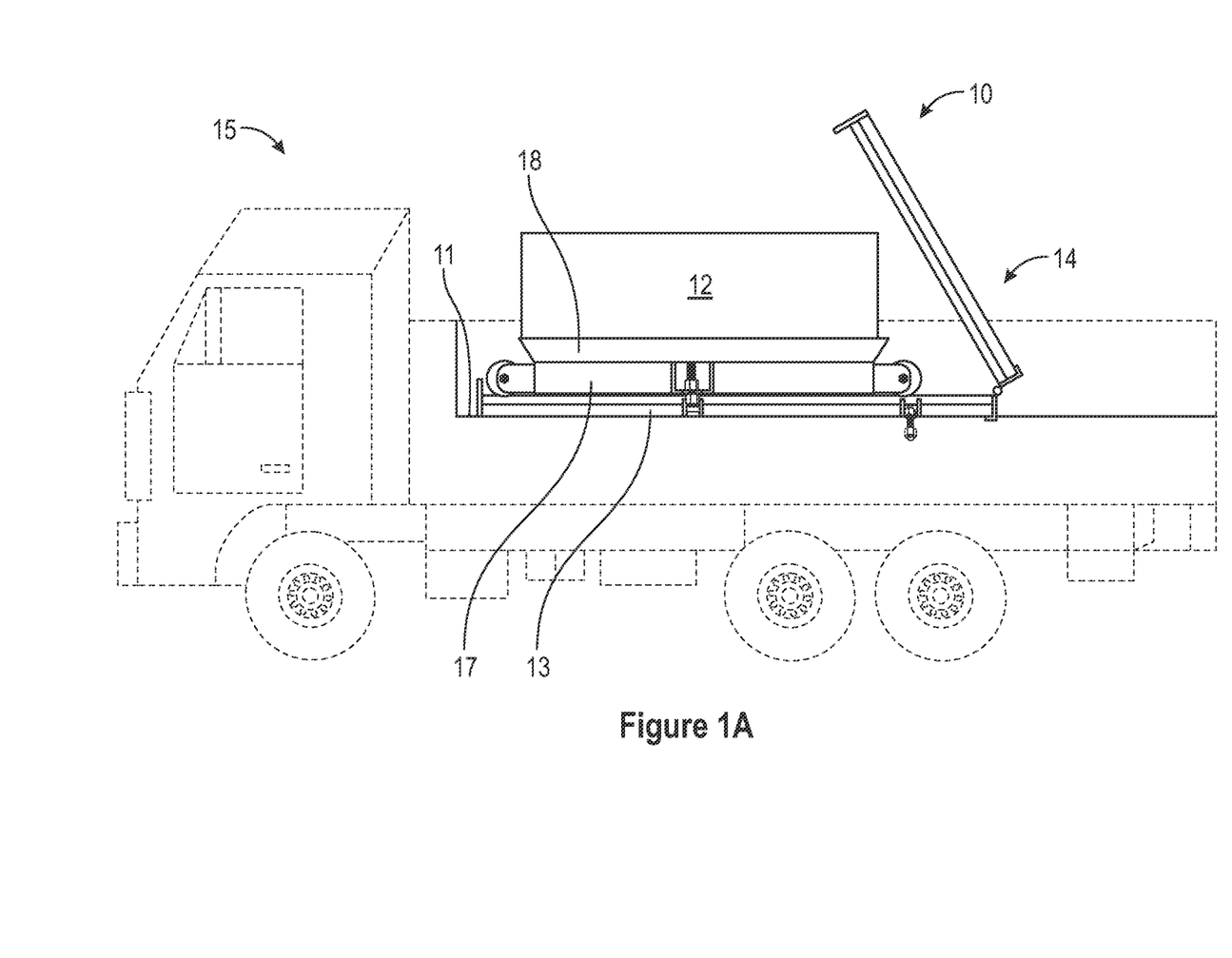
FIG. 1A illustrates a transport assembly mounted in a truck bed, in a stored configuration.
Figure 1B:
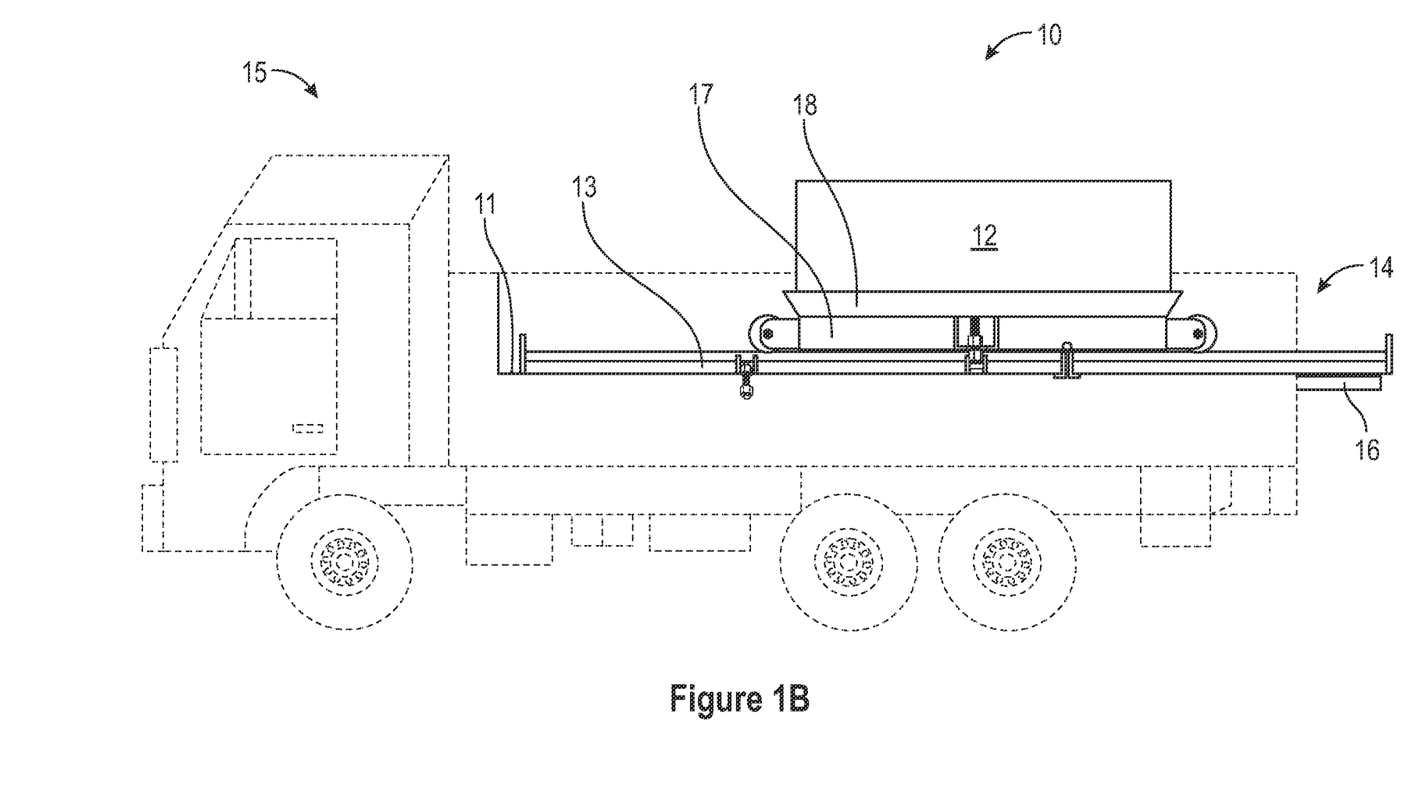
FIG. 1B illustrates the transport assembly in a deployed configuration, with the rail extension extended beyond the tailgate.

Referring to FIGS. 1A and 1B, an apparatus in the form of a transport assembly 10 is mounted in a truck bed 11 of a truck 15. The transport assembly 10 includes a rail assembly 13, a cart assembly 17 configured to move along the rail assembly 13, and a skid assembly 18 that supports a scanning machine 12. When in the stored or transport configuration of FIG. 1A, all components remain within the confines of the truck bed 11, with a tailgate 16 in its upright position. The system transitions to its deployed state, shown in FIG. 1B, where a rail extension assembly 14 rotates downward beyond the tailgate 16 to extend the operational range beyond the truck bed 11 rear edge. This configuration enables hook loader access to the skid assembly 18 while keeping operators safely outside the pickup box during loading operations.

The transport assembly 10 provides a complete solution for safely moving the scanning machine 12 from a secure transport position in the truck bed 11 to a deployable position at or beyond the rear of the truck bed 11. The rail assembly 13 mounts securely inside the truck bed 11, providing a stable foundation supporting the cart assembly 17 which carries the skid assembly 18 and scanning machine 12. The mounting system ensures the rail assembly 13 remains firmly anchored during both transport and loading operations.

While the illustrated embodiment shows a scanning machine 12 for devices used in the oil and gas industry, the transport assembly 10 can be adapted to transport various types of machinery or equipment. The skid assembly 18 can be configured to accommodate different sizes and shapes of equipment while maintaining secure transport and deployment capabilities. The principles and mechanisms described herein are applicable to any machinery that requires secure transport in a truck bed 11 and controlled deployment beyond the tailgate 16.

Figure 2:
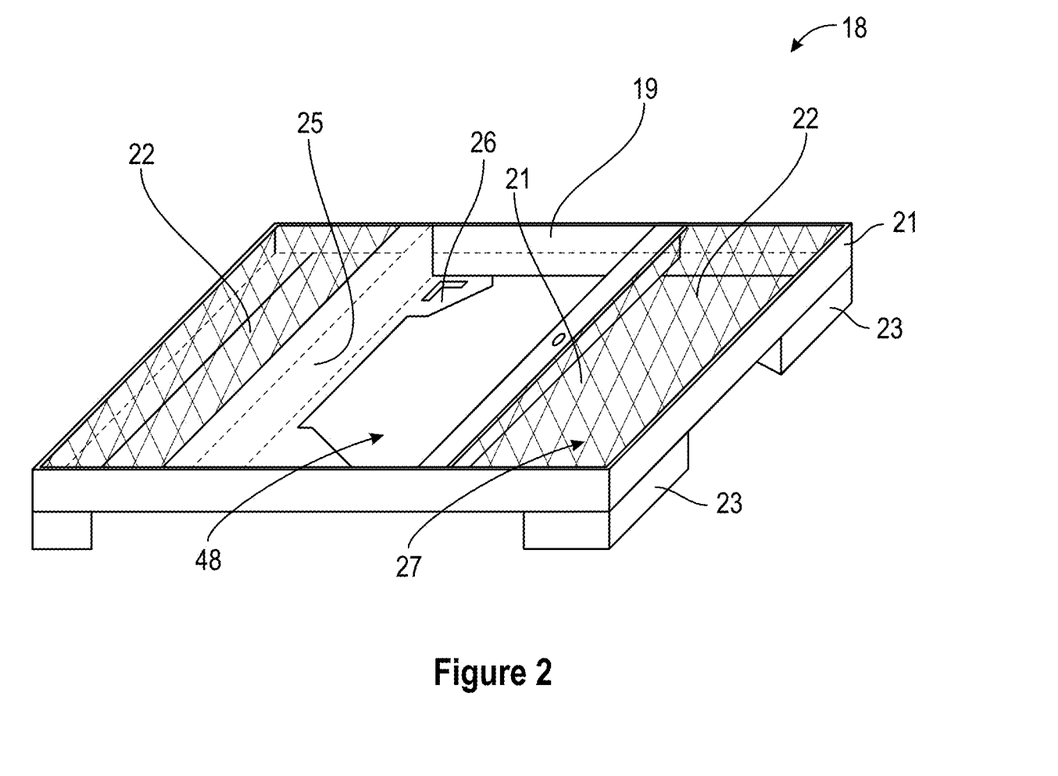
FIG. 2 is perspective view of a skid assembly.

Referring now to FIG. 2, the skid assembly 18 comprises a skid frame 21 having a rectangular configuration. The skid frame 21 is constructed from angled metal plates 19 that are bent into an L-shape and welded together to form the rectangular frame (other geometries are contemplated for use such as square tubular and the like). A mesh plate 22 is secured to an upper side of the skid frame 21, configured to provide traction and support for user access to the scanning machine 12. The heavy-duty mesh construction ensures stable footing while allowing visual inspection of components below. The skid frame 21 includes a second frame opening 27, opposite to the mesh plate 22, configured to optionally receive a second mesh plate 22 for additional structural rigidity.

Support members 23 are coupled to the skid frame 21 through welded connections. The support members 23 include a first pair positioned at a first end of the skid frame 21 and a second pair at a second end, with each pair angled in opposite directions relative to a ground surface for maximum stability. Each support member 23 includes an end cap plate that protects both the equipment and supporting surfaces while distributing load evenly. The opposing angles of the support pairs create a wider footprint for enhanced stability during loading operations. In some instances, each support member includes a reinforced cap plate welded to its end, which serves multiple functions. These cap plates are configured to distribute the load evenly across the contact surface, preventing damage to both the equipment and the supporting ground surface. The cap plates also provide additional stability during loading and unloading operations by increasing the total contact area between the support members and the ground. This design enhancement helps maintain the scanning equipment's position even on uneven terrain commonly encountered in field operations.

The skid assembly 18 further includes angled support members 25 secured to the skid frame 21, configured to provide lateral support for the scanning machine 12 (see FIG. 1). These angled support members 25 are metal plates bent at an angle and welded to the longitudinal sides of the skid frame 21. Triangular gusset plates 26 reinforce the connection between the angled support members 25 and the skid frame 21, providing additional structural integrity. The angled support members 25 and gusset plates 26 create a narrowed support area 48 precisely sized to accommodate the scanning machine 12, preventing lateral movement during transport. The gusset plates can be any polygonal geometric shape.

In some embodiments, one of the angled support members 25 can include an aperture 49. When the scanning machine 12 is placed in the support area 48, a securement mechanism such as a rope or chain (not shown) can be wrapped around the scanning machine 12 and looped or threaded through the aperture 49. This robust anchoring system secures the scanning machine 12 to the skid assembly 18 during both transport and loading operations.

Figure 3:
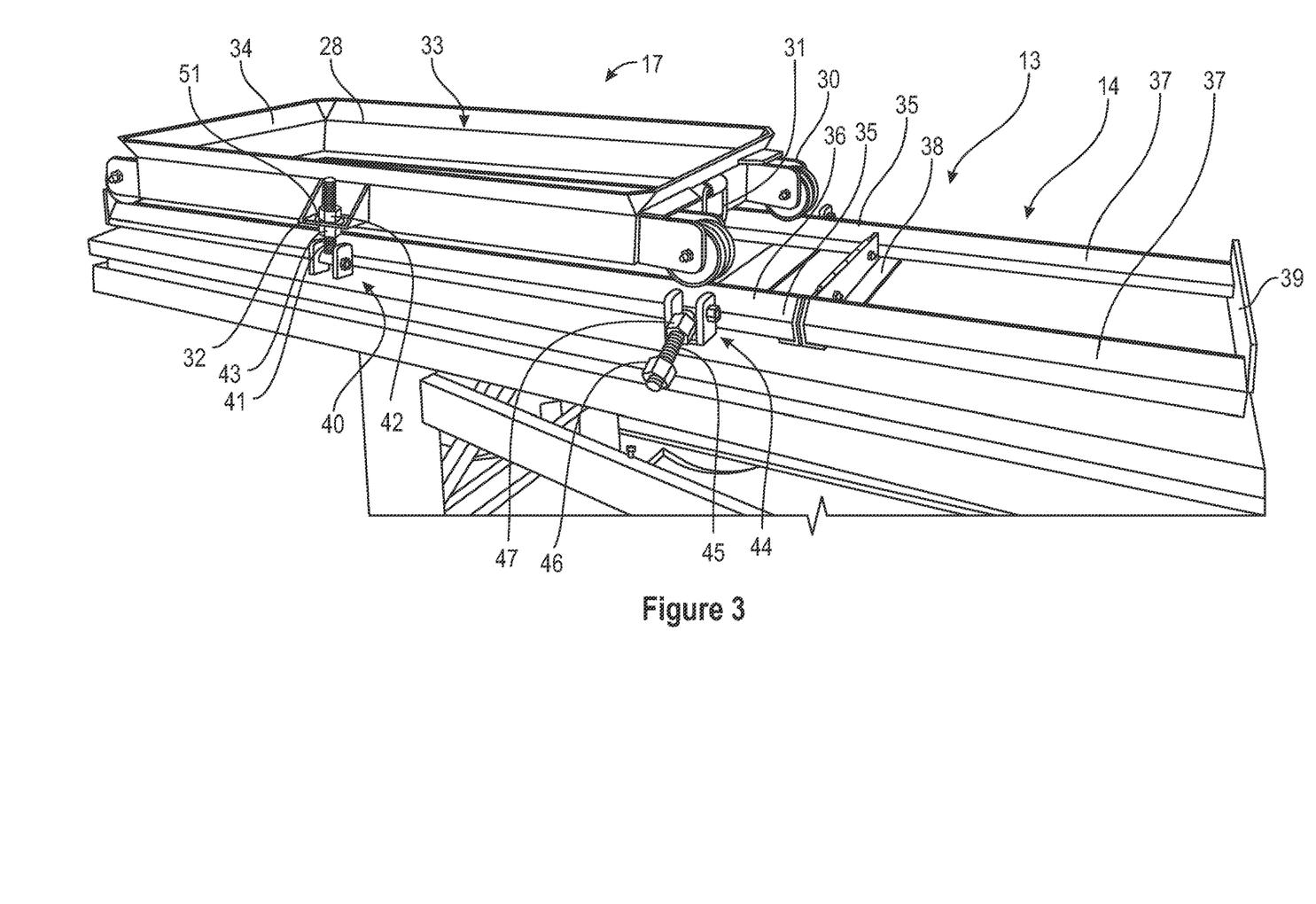
FIG. 3 is a detailed view of the cart assembly, including a close-up view of a locking mechanism.
Figure 4:
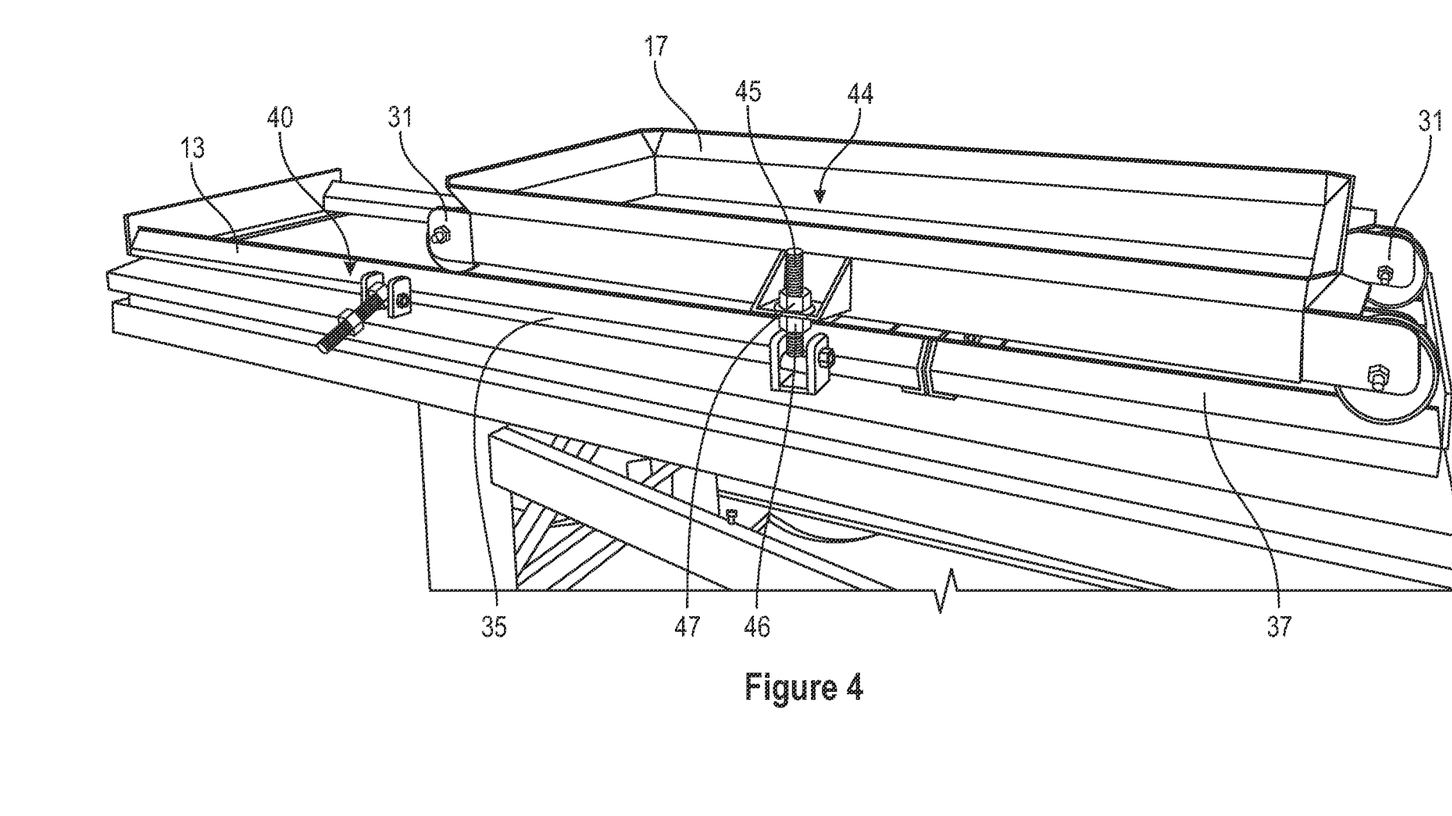
FIGS. 4 and 5 collectively illustrate the rail assembly with locking mechanisms and pivoting rail extension in both stowed and deployed positions.
Figure 5:
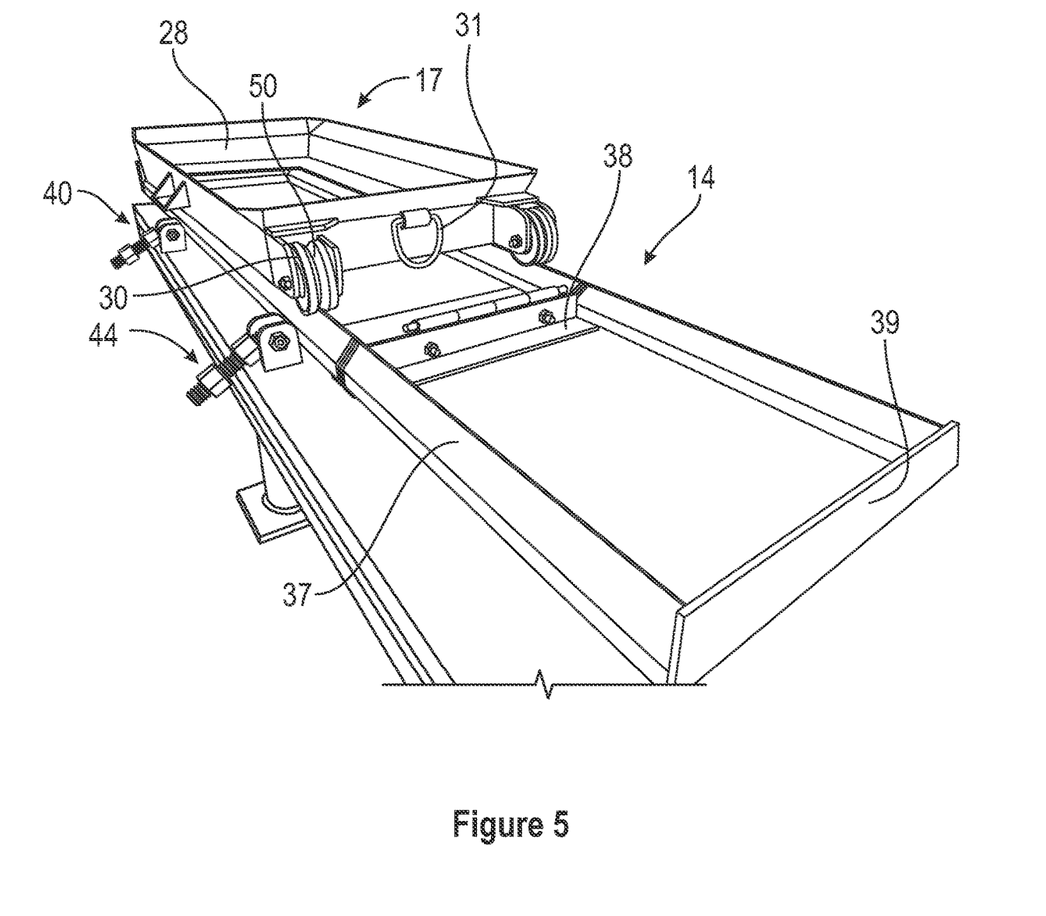

Referring now to FIGS. 3-5 collectively, the cart assembly 17 comprises a cart frame 28 constructed with a series of interconnected structural members forming a rectangular upper peripheral opening 33 sized to receive the skid assembly 18. The cart frame 28 includes angled frame members 34 that slope inward at the rectangular upper peripheral opening 33 to guide and center the skid assembly 18 during loading. The inward slope ensures proper alignment and prevents binding during loading operations.

The cart assembly 17 includes multiple v-groove wheels 30 mounted to the cart frame 28. Each V-groove wheel 30 includes a V-shaped channel 50 around its circumference configured to engage with the triangular-shaped rails (elongated rails 35 described below) of the rail assembly 13. The V-groove wheels 30 are arranged in pairs, with multiple pairs positioned along each side of the cart frame 28 to provide balanced support and smooth movement. This configuration allows for even weight distribution and maintains proper alignment during travel.

While some embodiments utilize a V-groove wheel and rail configuration to guide the cart assembly 17 along the rail assembly 13, it should be understood that other guiding mechanisms can be employed to achieve the same result. For example, the wheels May feature alternative profiles such as U-shaped or concave channels that correspond to complementary profiles on the rails. The wheel and rail profiles engage with each other to consistently guide the motion of the cart along the rails, maintaining proper alignment and stability during movement. Any suitable combination of wheel and rail profiles that achieve this guiding function can be utilized without departing from the scope of the disclosure.

A U-shaped handle 31 is coupled to the cart frame 28 to facilitate manual positioning and movement of the cart assembly 17. The cart frame 28 also includes engagement plates extending from its sides, each engagement plate 32 featuring a notch configured to interact with components of the rail assembly's locking mechanism. These engagement plates are strategically positioned to ensure secure locking in both transport and deployment positions.

The cart frame 28 is configured with a low-profile design to minimize overall height while maintaining structural integrity and proper wheel clearance. All structural joints of the cart frame 28 are reinforced to handle the combined weight of the cart assembly 17, skid assembly 18, and scanning machine 12 during both transport and deployment operations. The welded construction ensures rigid support under maximum load conditions.

In some embodiments, the rail assembly 13 comprises a pair of parallel elongated rails 35 configured to support and guide the cart assembly 17. Each elongated rail 35 includes an upper track surface 36 shaped to engage with the V-groove wheels 30 of the cart assembly 17. For example, the upper track surface 36 can be triangular in shape, however, other configurations all for the upper track surface 36 to have a complementary shape to the wheels 30.

A rail extension assembly 14 is pivotally coupled to an end of the rail assembly 13. The rail extension assembly 14 includes extension rails 37 aligned with the elongated rails 35 when in a deployed position. Rail cross-member 38 connects the extension rails 37 at their distal ends, with a stop member 39 positioned at the distal end to prevent the cart assembly 17 from traveling beyond the extension rails 37. This positive stop ensures safe operation during deployment.

The rail assembly 13 includes storage locking assemblies 40 positioned near the front of the rail assembly 13 and deployment locking assemblies 44 positioned near the rail extension assembly 14. The storage locking assemblies 40 secure the cart assembly 17 during transport in its stored configuration, while the deployment locking assemblies 44 secure the cart assembly 17 when in its deployed position. It will be understood that only one of each of the storage locking assemblies 40 and the deployment locking assemblies 44 are shown with the other locking assembly being disposed on the other side of the rail assembly 13 and out of view.

Each storage locking assembly 40 comprises a threaded rod 41 pivotally mounted to the rail assembly 13 (and more specifically to elongated rail 35). The threaded rod 41 is configured to rotate between vertical locked positions and horizontal unlocked positions. When in the vertical locked position, the threaded rod 41 engages with a notch 51 in the engagement plate 32 of the cart assembly 17. A threaded fastener 42 (upper) engages with the threaded rod 41 above the engagement plate 32, and threaded fastener 43 (lower) engages below the engagement plate 32, securing the cart assembly 17 in position. The deployment locking assemblies 44 are configured identically to the storage locking assembly 40, each having a threaded rod 45 and threaded fasteners 46 (upper), 47 (lower). These deployment locking assemblies 44 are configured to secure to other engagement plates 32.

Each threaded rod in the storage and deployment locking assemblies is pivotally mounted to the rail assembly 13. This pivoting connection allows the threaded rods to rotate between a vertical locked position, where they engage with the notches in the engagement plates 32 to secure the cart assembly 17, and a horizontal unlocked position, where they disengage from the engagement plates 32 to allow movement of the cart assembly 17 along the rail assembly 13.

The rail extension assembly 14 can be secured in a stowed position during transport, and can be rotated to a deployed position to extend the operational range of the transport assembly 10 beyond the truck bed 11. The extension provides necessary reach for proper positioning of the scanning equipment during field operations while maintaining stability throughout the deployment range.

Figure 6:
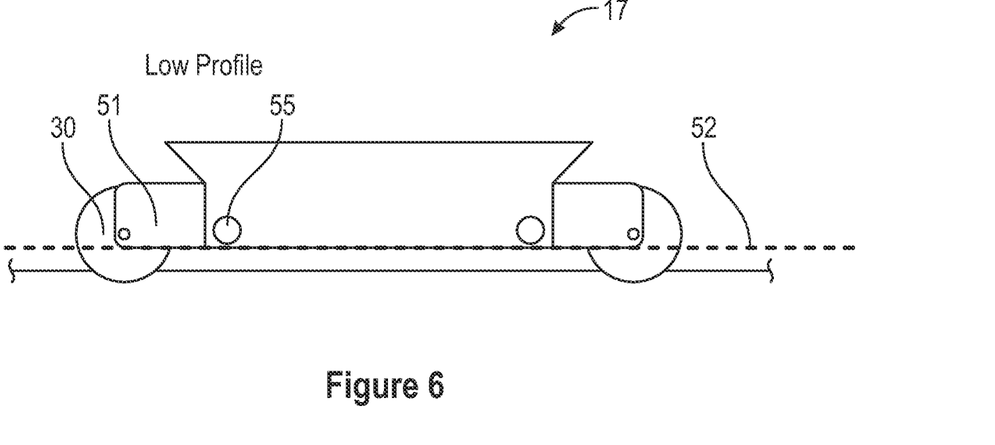
FIGS. 6 and 7 illustrate both low-profile and high-profile versions of a cart assembly.

FIG. 6 illustrates a low-profile embodiment of the cart assembly 17. The cart assembly 17 in this instance includes wheel brackets such as wheel bracket 51 that couple a wheel or other track-engaging member (such as V-groove wheel 30) with the cart frame 28 of the cart assembly 17. In a low-profile configuration, the wheel bracket 51 extends in parallel with the lower edge of the cart frame 28 along reference line 52. It will be understood that each track-engaging member can be coupled to the cart frame 28 via a wheel bracket.

Figure 7:
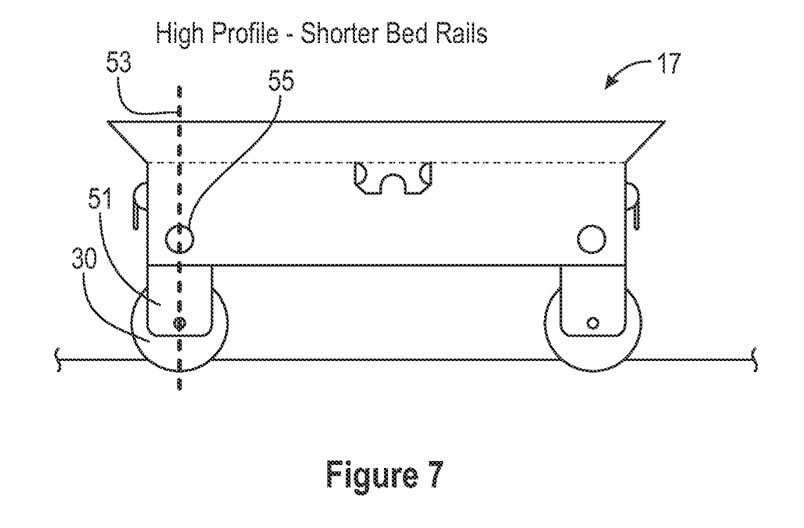

FIG. 7 illustrates a high-profile embodiment of the cart assembly 17. The cart assembly 17 in this instance includes wheel brackets such as wheel bracket 51 that couple a wheel or other track-engaging member (such as V-groove wheel 30) with the cart frame 28 of the cart assembly 17. In a high-profile configuration, the wheel bracket 51 extends orthogonally to the lower edge of the cart frame 28 along reference line 53. It will be understood that each track-engaging member can be coupled to the cart frame 28 via a wheel bracket.

In some instances, each wheel bracket 51 is pivotally coupled to the cart frame 28 using a pivoting member 55, allowing the wheel bracket 51 and track-engaging member to pivot from a low-profile configuration to a high-profile configuration.

In one example, the pivoting member 55 can include a pin-and-collar assembly that enables rotation of the wheel bracket 51 between low-profile and high-profile configurations. The assembly comprises a steel pivot pin extending through aligned holes in the cart frame 28 and wheel bracket 51. The pin includes a threaded portion on one end and a head on the opposite end, with a locking collar having internal threads that engage with the threaded portion. The pin diameter allows rotation while maintaining contact with the supporting surfaces.

The wheel bracket 51 includes two notch sets positioned 90 degrees apart that receive a spring-loaded detent pin mounted to the cart frame 28. The detent pin engages when aligned with either the low-profile or high-profile position notch. A pull ring connects to the detent pin for disengagement. During configuration changes, the operator disengages the detent pin from the current position notch, allowing wheel bracket 51 rotation on the pivot pin until reaching the target position, where the detent pin enters the corresponding notch. The locking collar can be adjusted to control movement in the assembly.

The system includes multiple operating features. Indicators on the wheel bracket 51 show the configuration state. The detent pin uses a two-step disengagement sequence. Position stops limit rotation to the defined configurations, and markings indicate detent pin position. These are example of mechanism that can be used to enable the pivoting member.

C. Operation of Preferred Embodiment

The operation of the transport assembly 10 for oil and gas scanning equipment follows a systematic procedure ensuring safe loading, transport, and field deployment. The sequence begins at the front of the truck bed 11, where the cart assembly 17 is positioned on the rail assembly 13. The operator first confirms proper engagement between the v-groove wheels 30 and elongated rails 35, which enables controlled linear movement throughout the truck bed 11. Prior to hook loader engagement, locking assemblies 40, 44 must be fully disengaged. Unlocking the threaded fasteners and rotating each threaded rod 41, 45 to their horizontal unlocked position, providing necessary clearance for movement.

The skid assembly 18, supporting the scanning machine 12, is then positioned using appropriate hook loader equipment. Critical to this step is precise alignment between the support members 23 of the skid assembly 18 and their corresponding receiving points on the cart frame 28. The mesh plate 22 design allows operators to visually verify proper alignment from a safe distance, while end cap plates 24 on the support members 23 prevent damage during the loading process.

Once the skid assembly 18 is properly seated on the cart assembly 17, the operator methodically engages each locking assembly 40, 44 by rotating the threaded rods 41, 45 from horizontal to vertical position, verifying full engagement through the notches in engagement plates 32. The operator then installs and tightens upper threaded fasteners above the engagement plates and lower threaded fasteners below the engagement plates 32. Each locking assembly along the rail system must be secured in this sequence to ensure the scanning equipment remains stable during transport.

During transport between sites, the cart assembly 17 is moved using the U-shaped handle 31, with the V-groove wheel 30 design maintaining precise rail alignment throughout movement. Operators must observe the stop member 39 when approaching rail ends to prevent overtravel. For field deployment, the rail extension assembly 14 transitions from its stowed transport position by releasing the extension assembly from transport locks, rotating downward past the tailgate 16, verifying proper rail alignment at transition points, and confirming secure engagement in deployed position.

While various embodiments have been described above, it should be understood that they have been presented by way of example only, and not limitation. The descriptions are not intended to limit the scope of the technology to the particular forms set forth herein. To the contrary, the present descriptions are intended to cover such alternatives, modifications, and equivalents as may be included within the spirit and scope of the technology as defined by the appended claims and otherwise appreciated by one of ordinary skill in the art. The various embodiments of the present disclosure may be embodied in other specific forms without departing from the spirit or essential attributes thereof, and it is therefore desired that the various embodiments in the present disclosure be considered in all respects as illustrative and not restrictive. Thus, the breadth and scope of a preferred embodiment should not be limited by any of the above-described exemplary embodiments.

Unless otherwise defined, all technical and scientific terms used herein have the same meaning as commonly understood by one of ordinary skill in the art to which this invention belongs. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. Any headings utilized within the description are for convenience only and have no legal or limiting effect.

What is claimed is:

1. An apparatus for transporting a scanning machine, the apparatus comprising:
   a skid configured to support a scanning machine, the skid comprising:
      a skid frame having a rectangular configuration;
      a mesh surface secured to the skid frame, the mesh surface configured to provide traction and support for a user;
      a plurality of support members coupled to the skid frame, the support members elevating the frame above a subordinate surface when placed in a target location;
   a cart comprising:
      a cart frame configured to receive and support the skid; and
      a plurality of v-groove wheels connected to the cart frame; and
   a rail system configured to support the cart, the rail system comprising a pair of elongated rails, wherein the v-groove wheels of the cart engage with the pair of elongated rails, wherein the cart is movable along the rails to transport the skid and the scanning machine.

2. The apparatus of claim 1, wherein the rail system further comprises a folding extension pivotally coupled to an end of the rail system, the folding extension being configured to rotate between a deployed position and a stowed position.

3. The apparatus of claim 2, wherein the folding extension, when in the deployed position, increases an overall length of the rail system, and when in the stowed position, is secured to lock the skid in place.

4. The apparatus of claim 2, further comprising a stop member positioned at a distal end of the folding extension.

5. The apparatus of claim 1, wherein the cart is configured to move along the rail system from a first position adjacent to a front end of a truck bed to a second position adjacent to a rear end of the truck bed.

6. The apparatus of claim 1, further comprising angled support members secured to opposing longitudinal portions of the skid frame and slope inward to form a narrowed support opening for receiving the scanning machine, each angled support member being reinforced by triangular gusset plates between the angled support members and the skid frame.

7. The apparatus of claim 1, wherein the skid further comprises a locking member comprising a threaded rod pivotally connected to the rail system, wherein the threaded rod is configured to rotate between a vertical locked position and a horizontal unlocked position.

8. The apparatus of claim 7, further comprising an engagement plate extending from the cart frame, the locking member mating with the engagement plate, and wherein the plurality of support members are welded to the frame.

9. The apparatus of claim 1, wherein the cart frame comprises angled frame members that form an upper peripheral opening of the cart frame.

10. An apparatus for transporting a scanning machine, the apparatus comprising:
    a skid configured to support a scanning machine, the skid comprising:
       a skid frame;

a first mesh surface secured to an upper side of the skid frame, the first mesh surface configured to provide traction;

a plurality of support members welded to the frame, the support members elevating the skid above the ground surface, wherein the support members comprise a first pair at a first end of the skid and a second pair at a second end of the skid;

a cart comprising:
   a cart frame configured to receive and support the skid;
   a plurality of grooved wheels connected to the cart frame;
   a handle attached to the cart frame to facilitate manual movement of the cart; and a rail system configured to support the cart, the rail system comprising:
   a pair of elongated rails, wherein the grooved wheels of the cart engage with the pair of elongated rails;

a locking member pivotally connected to the rail system, the locking member configured to rotate between a vertical locked position and a horizontal unlocked position and engage with the cart;

a folding extension pivotally coupled to an end of the rail system, the folding extension being configured to rotate between a deployed position and a stowed position, and a stop member positioned at a distal end of the folding extension; and wherein the cart is movable along the rails to transport the skid and the scanning machine between a front end and a rear end of a truck bed, and the folding extension, when in the deployed position, increases an overall length of the rail system, and when in the stored position, is secured to lock the skid in place.

11. The apparatus of claim 10, wherein the grooved wheels are v-groove wheels.

12. The apparatus of claim 10, further comprising an engagement plate extending from the cart frame.

13. The apparatus of claim 12, wherein the locking member comprises:
   a threaded rod pivotally mounted to the rail system;
   a first threaded fastener engaged with the threaded rod above the engagement plate; and
   a second threaded fastener engaged with the threaded rod below the engagement plate.

14. The apparatus of claim 13, wherein the engagement plate includes a notch, the threaded rod being received in the notch when in the vertical locked position.

15. The apparatus of claim 10, further comprising a second mesh surface secured to an opposing side of the skid frame relative to the first mesh surface.

16. The apparatus of claim 10, wherein the folding extension comprises a pair of extension rails aligned with the elongated rails when in the deployed position, and a cross-member connecting the extension rails at their distal ends.

17. The apparatus of claim 10, wherein the handle of the cart comprises a U-shaped bar coupled to the cart frame.

18. The apparatus of claim 10, further comprising multiple locking members positioned along both longitudinal sides of the rail system, each locking member comprising a threaded rod with first and second threaded fasteners, configured to secure the cart at multiple points.

19. The apparatus of claim 10, wherein the skid comprises a plurality of metal plates bent at an angle and attached to the skid frame to provide lateral support for the scanning machine.

20. The apparatus of claim 19, wherein each metal plate of the skid comprises a vertical portion welded to a lateral member of the frame and a horizontal portion extending inward to support an edge of the scanning machine.

* * * * *